US007291377B2

(12) United States Patent
Ahn et al.

(10) Patent No.: US 7,291,377 B2
(45) Date of Patent: Nov. 6, 2007

(54) PLASMA DISPLAY PANEL

(75) Inventors: Jung-Keun Ahn, Cheonan (KR); Hyun-Chul Song, Asan (KR); Tae-Ho Lee, Asan (KR)

(73) Assignee: Samsung SDI Co., Ltd., Suwon-si, Gyeonggi-do (KR)

(*) Notice: Subject to any disclaimer, the term of this patent is extended or adjusted under 35 U.S.C. 154(b) by 93 days.

(21) Appl. No.: 10/698,433

(22) Filed: Nov. 3, 2003

(65) Prior Publication Data

US 2004/0091672 A1 May 13, 2004

(30) Foreign Application Priority Data

Nov. 5, 2002 (KR) ...................... 10-2002-0068084

(51) Int. Cl.
*B32B 7/00* (2006.01)
*H01J 17/49* (2006.01)

(52) U.S. Cl. ................. 428/120; 428/178; 315/111.21; 313/231.31; 313/582; 313/610

(58) Field of Classification Search ................ 428/116, 428/118, 119, 120, 175; 315/111.21, 111.71; 313/231.31, 582, 610, 625, 292
See application file for complete search history.

(56) References Cited

U.S. PATENT DOCUMENTS 5,541,618 A 7/1996 Shinoda
5,661,500 A 8/1997 Shinoda et al.
5,663,741 A 9/1997 Kanazawa
5,674,553 A 10/1997 Shinoda et al.
5,684,362 A 11/1997 Togawa
5,724,054 A 3/1998 Shinoda
5,786,794 A 7/1998 Kishi et al.
5,844,639 A * 12/1998 Togawa ....................... 349/32

(Continued)

FOREIGN PATENT DOCUMENTS

JP 02-148645 6/1990

(Continued)

OTHER PUBLICATIONS

*Office Action* from the Korean Industrial Property Office issued in Applicant's corresponding Korean Patent Application No. 10-2002-0068084 (dated Sep. 30, 2004).

(Continued)

*Primary Examiner*—Donald J. Loney
(74) *Attorney, Agent, or Firm*—Robert E. Bushnell, Esq.

(57) ABSTRACT

A novel design for dummy ribs in a plasma display panel. The plasma display panel includes upper and lower substrates which are installed to be spaced apart from each other by a predetermined distance and which contain therebetween a plurality of barrier ribs and discharge spaces that are between the barrier ribs. The plasma display panel has a display region for displaying images from the discharge spaces. Outside the display region are formed sets of dummy ribs which are positioned in parallel to each other and spaced by a predetermined distance from the display region. Dummy ribs serve to support the upper and lower substrates while maintaining a predetermined distance therebetween. Each set of dummy ribs has at least one reinforcing rib specially designed to be resilient to damage. When exposed to sandblasting, the reinforcing rib remains functional and continues to keep the upper and the lower substrates separated by a predetermined distance.

2 Claims, 12 Drawing Sheets

U.S. PATENT DOCUMENTS

| | | | | |
|---|---|---|---|---|
| 5,886,467 | A * | 3/1999 | Kimura | 313/582 |
| 5,952,782 | A | 9/1999 | Nanto | |
| 6,090,464 | A * | 7/2000 | Yoo | 428/73 |
| 6,166,711 | A | 12/2000 | Odake | |
| 6,285,128 | B1 | 9/2001 | Amemiya | |
| RE37,444 | E | 11/2001 | Kanazawa | |
| 6,400,079 | B1 | 6/2002 | Baret et al. | |
| 6,400,080 | B1 * | 6/2002 | Tanaka | 313/582 |
| 6,590,332 | B1 | 7/2003 | Park et al. | |
| 6,630,916 | B1 | 10/2003 | Shinoda | |
| 6,707,436 | B2 | 3/2004 | Setoguchi et al. | |
| 6,855,026 | B2 * | 2/2005 | Fujinaga et al. | 445/24 |
| 2002/0050788 | A1 | 5/2002 | Kimura et al. | |
| 2004/0056597 | A1 * | 3/2004 | Ko et al. | 313/582 |
| 2005/0023979 | A1 * | 2/2005 | Kang | 313/582 |

FOREIGN PATENT DOCUMENTS

| | | |
|---|---|---|
| JP | 2845183 | 10/1998 |
| JP | 2917279 | 4/1999 |
| JP | 2000-277020 | 10/2000 |
| JP | 2000-340123 | 12/2000 |
| JP | 2001-043804 | 2/2001 |
| JP | 2001-160360 | 6/2001 |
| JP | 2001-236890 | 8/2001 |
| JP | 2001-307643 | 11/2001 |
| JP | 2001-325888 | 11/2001 |
| JP | 2002-304948 | 10/2002 |
| WO | WO 02/084689 | 10/2002 |

OTHER PUBLICATIONS

"*Final Draft International Standard*", Project No. 47C/61988-1/Ed. 1; Plasma Display Panels—Part 1: Terminology and letter symbols, published by International Electrotechnical Commission, IEC. in 2003, and Appendix A—Description of Technology, Annex B—Relationship Between Voltage Terms And Discharge Characteristics; Annex C—Gaps and Annex D—Manufacturing.

Japanese Office Action of the Japanese Patent Application No. 2003-277532, issued for Jun. 6, 2006.

* cited by examiner

PLASMA DISPLAY PANEL

CLAIM OF PRIORITY

This application claims the priority of Korean Patent Application No. 2002-68084, filed on Nov. 5, 2002, in the Korean Intellectual Property Office, the disclosure of which is incorporated herein in its entirety by reference.

BACKGROUND OF THE INVENTION

1. Field of the Invention

The present invention relates to a plasma display panel, and more particularly, to a plasma display panel with an improved design for dummy ribs.

2. Description of the Related Art

A plasma display panel displays an image on a screen using light emitted when a fluorescent material or a special gas is excited. A plasma display panel is roughly classified into three groups: AC type, DC type, and hybrid type.

In a display area of a plasma display panel, barrier ribs are formed on a lower substrate in the display area before being attached to the upper substrate. Outside the display area, additional ribs, called dummy ribs may also be formed. Dummy ribs are formed to maintain distance between the upper and the lower substrate during the process of making the plasma display panel.

Often, the dummy ribs are formed in sets containing 3 or 4 ribs in parallel with each other. Japanese Patent Laid-Open Publication No. 2001-160360 discloses in FIG. 2 an AC type plasma display panel having a plurality of dummy ribs 11 outside a display region to reduce abnormal discharge. However, the design of dummy ribs 11 in FIG. 2 of JP 2001-160360 cannot withstand sandblasting. Sandblasting can cause one or more of the dummy ribs 11 to fail. When one or more dummy ribs 11 fail, the failed dummy ribs do not well serve to maintain proper distance between the upper and the lower substrates.

SUMMARY OF THE INVENTION

It is therefore an object of the present invention to provide an improved design for dummy ribs in a plasma display panel.

It is also an object of the present invention to provide a design for dummy ribs in a plasma display panel that can maintain structural strength even after sandblasting.

It is further an object of the present invention to provide a design for dummy ribs in a plasma display panel that can function to maintain proper distance between the upper and the lower substrates even after a being subjected to sandblasting.

These and other objects can be achieved by a plasma display panel having upper and lower substrates which are installed to be spaced apart from each other by a predetermined distance. The plasma display device has a display region for displaying images and has portions outside the display region. Within the display region are a plurality of barrier ribs with discharge spaces between adjacent barrier ribs. Outside the display region are sets of dummy ribs, each containing several dummy ribs in parallel to each other and spaced apart from the display region. The dummy ribs serve to keep the upper and the lower substrates separated by a predetermined distance. Each set of dummy ribs preferably has at least one reinforcing dummy rib. When the plasma display panel is subjected to stress, the reinforcing rib is so designed to remain intact so that the reinforcing rib still serves to maintain the space between the upper and lower substrates. The upper and the lower substrates are sealed together by a sealant for sealing the edges of the upper and lower substrates.

The reinforcing rib may be formed of a series of closed ring structures with a cross-section of a predetermined shape. The closed ring structures may have a polygonal or circular cross-section. The dummy ribs maybe formed in sets at each of the four ends of the substrate. Each set may have up to three or more parallel dummy ribs on each side of the display portion. Each set of dummy ribs may have at least one reinforcing rib. It is preferred that the reinforcing rib is closer to the display region than other dummy ribs in the set. The dummy ribs may instead have at least one connecting rib for connecting neighboring dummy ribs within a set to each other. The dummy ribs may instead have at least one reinforcing rib with multiple bending portions.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
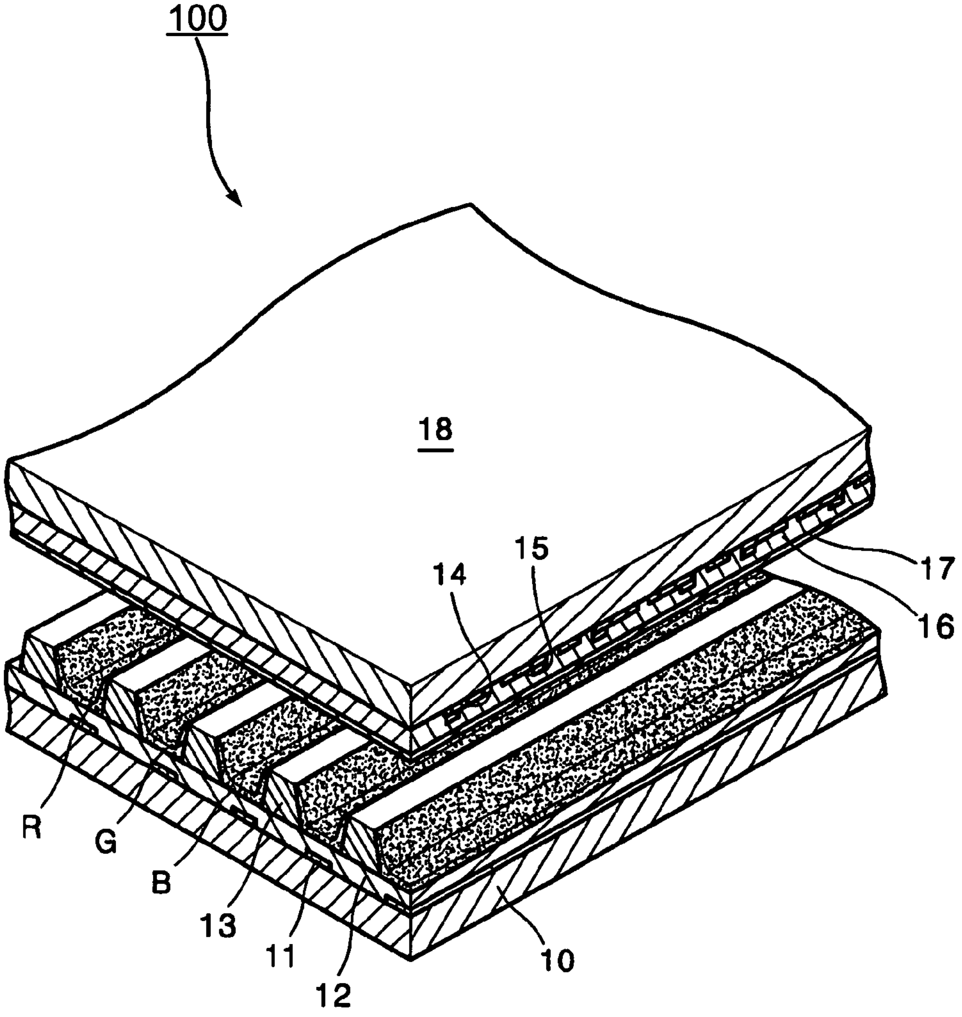
FIG. 1 (Prior Art)
FIG. 1 is an exploded perspective view of a plasma display panel.

Turning to the figures, FIG. 1 illustrates one example of an AC type plasma display panel 100. Referring to FIG. 1, the plasma display panel 100 is made up of a lower substrate 10 that has an address electrode 11, a lower dielectric layer 12, and a barrier rib 13 which are sequentially formed on the lower substrate 10. The barrier rib 13 serves to maintain a discharge space and prevent electric or optical cross-talk among cells. The barrier rib 13 can be made to have a stripe-shaped or a lattice-shaped pattern. The plasma display panel 100 also includes an upper substrate 18, which is coupled with the lower substrate 10. A patterned electrode pair 14 and 15, an upper dielectric layer 16, and an MgO film 17 are sequentially formed on the upper substrate 18. The electrode pair 14 and 15 are both orthogonal to the address electrode 11 and are embedded in the upper dielectric layer 16. A fluorescent layer is formed at one or more sides of a discharge space partitioned by the barrier rib 13.

In a plasma display panel 100 having the aforementioned elements, when a predetermined voltage is applied to each electrode, cations accumulate in the lower dielectric layer 12. The accumulated cations induce a preliminary trigger discharge between one electrode of the electrode pair 14 and 15 and the lower address electrode 11, thereby forming charged particles. As a result, a main discharge takes place between the electrode pair 14 and 15. Any light generated during the main discharge excites the fluorescent layer to thereby form an image.

Figure 2:
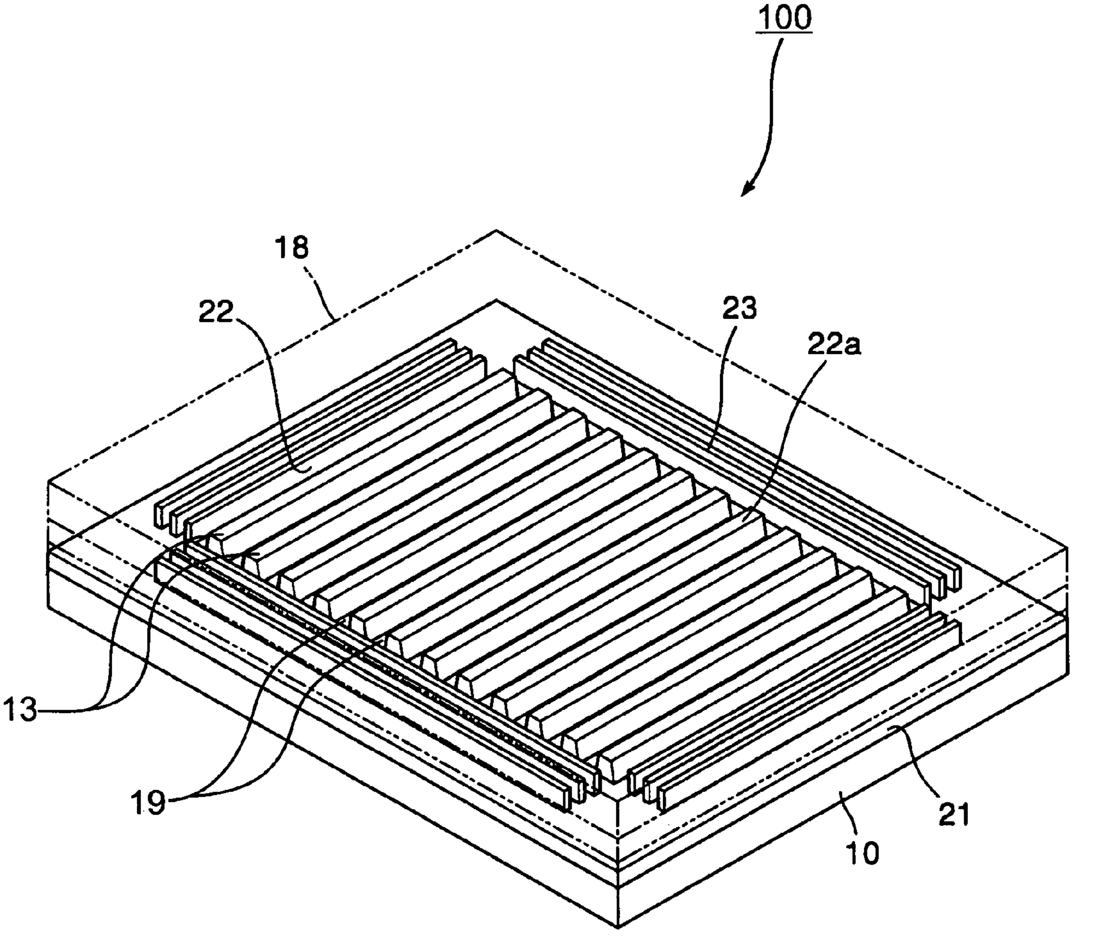
FIG. 2 (Prior Art)
FIG. 2 is a perspective view of the plasma display panel illustrated in FIG. 1.

An image forming area is designated as an effective area (22 in FIG. 2) and a central inner portion of the two substrates that forms the effective area is designated as a display region (22*a* in FIG. 2).

Turning to FIG. 2, FIG. 2 illustrates a perspective view of the plasma display panel 100 of FIG. 1 after the upper substrate 18 is bonded to the lower substrate 10. When the upper and lower substrates 18 and 10 respectively are formed as mentioned above, the two substrates are bonded together with a sealing glass or other sealant 21 as illustrated in FIG. 2. The sealing glass 21 is sintered and dried. Then, the inside of the two substrates is filled with a discharge gas and the two substrates are completely sealed together. This completes the formation of plasma display panel 100.

The plasma display panel of FIG. 2 also has dummy ribs 23, which are formed between the display area or the effective area 22 and the sealing glass 21. The dummy ribs 23 are used as support members when the upper and lower substrates 18 and 10 respectively are clipped to each other during the sealing process during the making of the plasma display panel. In addition, the dummy ribs 23 serve to prevent a binder and other substances that are contained in the sealing glass from flowing into the display region 22.

Such dummy ribs 23 are intended to prevent bending of the upper and lower substrates 18 and 10 respectively during the clipping process and also to prevent contamination of the inside of the upper and lower substrates 18 and 10 by outgassing from a frit glass. However, such dummy ribs 23 may be damaged during a sand blasting process because closed type ribs experience an approximately 12 to 13% higher abrasive sand blasting pressure than open type ribs. In addition, because such dummy ribs 23 are formed in sets of three or four line patterns having the same distance, the turbulence of an abrasive sand may occur between the display region 22 and the dummy ribs 23. As a result, a dummy rib adjacent to the display region 22 may be damaged by abrasion. Consequently, whole dummy ribs may not be able to withstand the pressure of the upper substrate 18 and thus fail to maintain the proper space between the upper and lower substrates 18 and 10 after being exposed to sandblasting.

Figure 3:
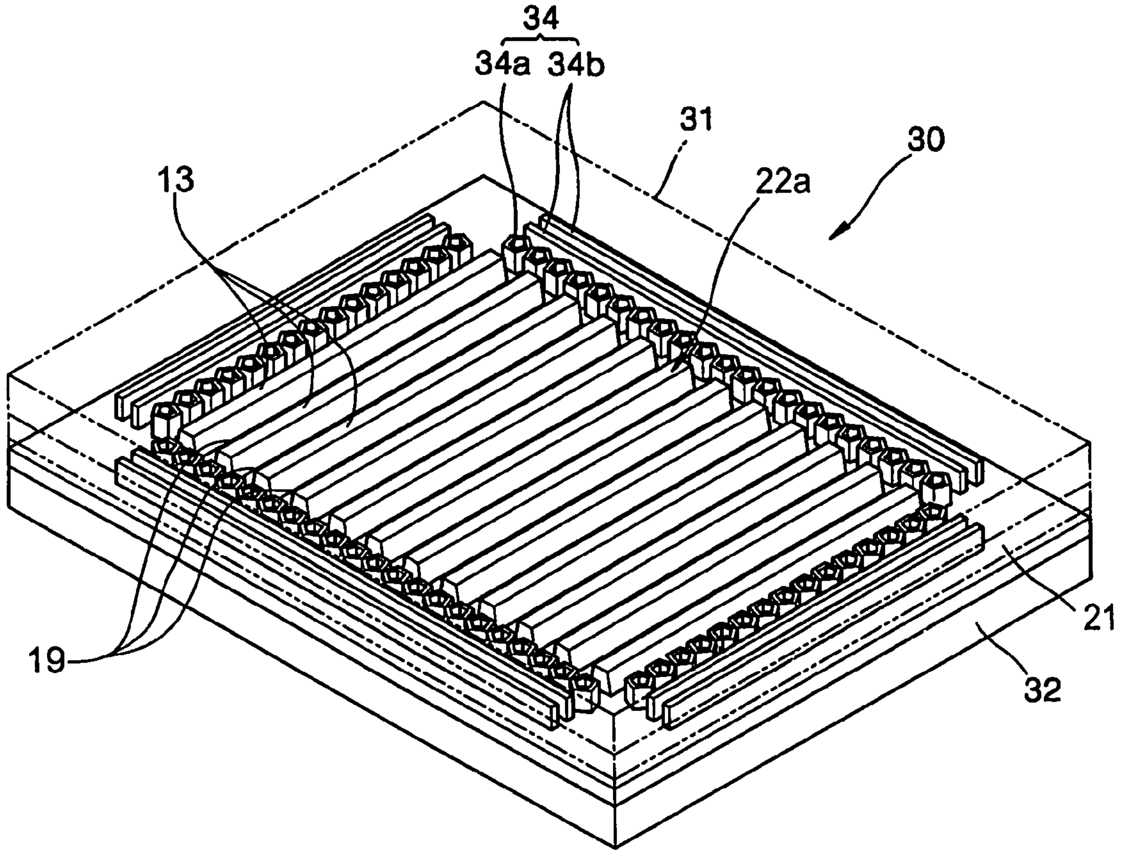
FIG. 3 is a perspective view of the structure of a plasma display panel according to a first embodiment of the present invention.

FIG. 3 illustrates a perspective view of the structure of a plasma display panel 30 according to a first embodiment of the present invention. Referring to FIG. 3, plasma display panel 30 is made up of upper and lower substrates 31 and 32 which are installed to be spaced apart from each other by a predetermined distance and which contain therebetween a plurality of barrier ribs 13 and discharge spaces 19 that are between adjacent barrier ribs 13. The barrier ribs 13 are located only within display region 22*a* that displays images by the discharge spaces. A plurality of sets of dummy ribs 34 are located outside display region 22*a*. Each dummy rib in a set 34 is parallel with the other dummy ribs in that same set. Display 30 illustrates four sets of dummy ribs 34, one on each side of the display region 22*a*. The sets of dummy ribs 34 serve to keep the upper and lower substrates 31 and 32 separated by a predetermined distance. At least one of the plurality of dummy ribs in a set 34 is a reinforcing rib 34*a*. Reinforcing rib 34*a* is designed to withstand damage caused by sandblasting while still being able to function by keeping the upper and the lower substrates 31 and 32 separated by the predetermined distance. Plasma display panel 30 also is made up of a sealant 21 for sealing the edges of the upper and lower substrates 31 and 32.

As illustrated in FIG. 3, each set of dummy ribs 34 has three ribs parallel to each other and disposed outside of the display region 22*a*. Alternatively, the dummy rib sets 34 may contain four or more ribs per set. Preferably, the rib in each set that is closest to the display region 22*a* is the reinforcing rib 34*a*. The reinforcing rib 34*a* is preferably a series of ring holders (or ribs forming a closed pattern) with a pentagonal cross-section, while the other two ribs 34*b* in the set 34 are simple long rectangular walls. Because of the shape and design of reinforcing rib 34*a*, even if some parts of the reinforcing rib 34*a* adjacent to the display region 22*a* are abraded during a sand blasting process, the structural strength of the reinforcing rib 34*a* can be maintained by its pentagonal parts. At the same time, the reinforcing rib 34*a* serves to prevent damage to the other two dummy ribs 34*b* during sand blasting.

Figure 4:
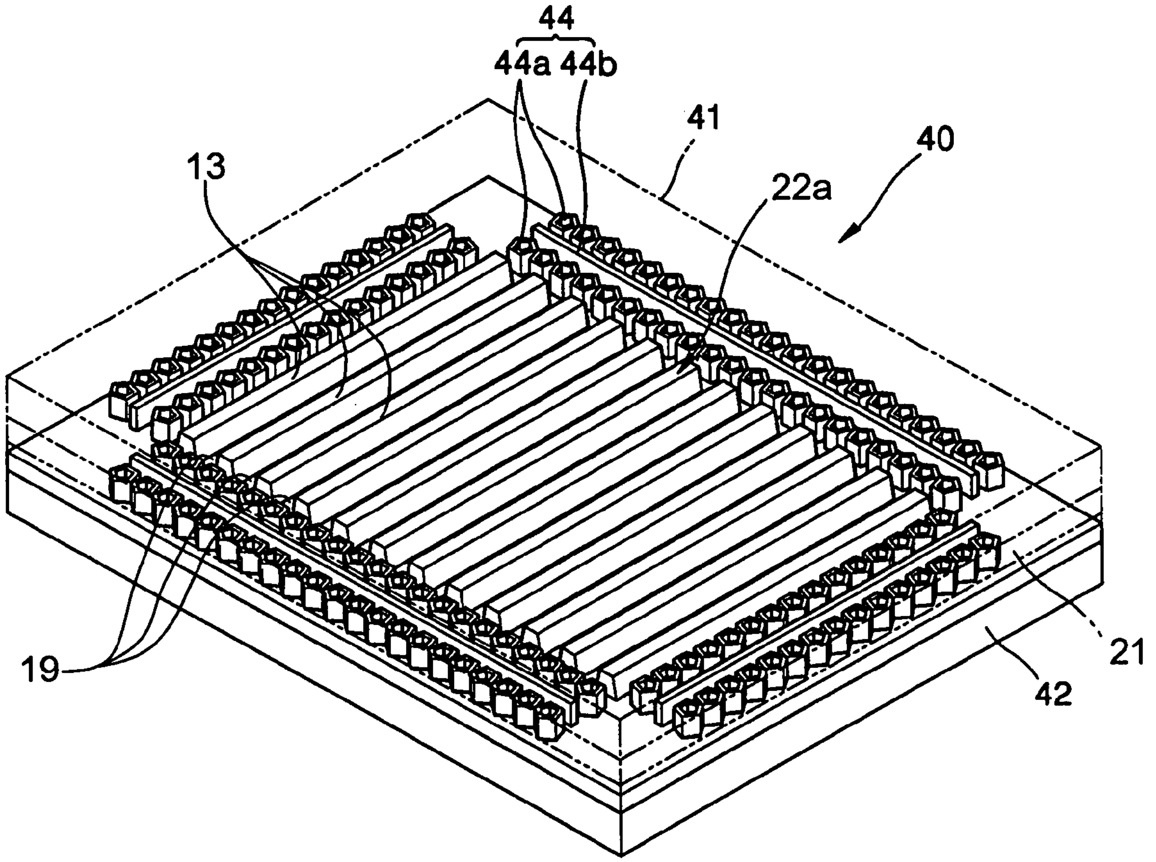
FIG. 4 is a perspective view of the structure of a plasma display panel according to a second embodiment of the present invention.

FIG. 4 illustrates a perspective view of the structure of a plasma display panel 40 according to a second embodiment of the present invention. Referring to FIG. 4, plasma display panel 40 is made up of upper and lower substrates 41 and 42 which are installed to be spaced apart from each other by a predetermined distance. Display region 22*a* is used to display the images. Within the display region 22*a* are the plurality of barrier ribs 13 and discharge spaces 19 that are disposed between adjacent barrier ribs 13. Outside of the display region 22*a* are up to four sets of dummy ribs 44. As illustrated in FIG. 4, each set of dummy ribs 44 has three ribs, all being parallel to each other. The middle rib within each set is a linear, rectangular rib 44*b*. On each side of rib 44*b* are the reinforcing ribs 44*a*. The plasma display panel 40 according to the second embodiment differs from the plasma display panel 30 of the first embodiment in that two reinforcing ribs 44*a* are present in each set 44 instead of one. As in the first embodiment, the dummy rib sets 44 are spaced apart from the display region 22*a*, reinforcing ribs 44*a* serve to maintain the upper substrate 41 to be a predetermined distance from the lower substrate 42, even if the reinforcing ribs are damaged. A sealant 21 is used to fasten the upper substrate to the lower substrate.

As illustrated in FIG. 4, each set of dummy ribs 44 has three ribs in parallel. However, it is possible to have four or more ribs in each set. Two ribs that are positioned closest to and farthest from the display region 22*a* are the reinforcing ribs 44*a*. A simple long rectangular rib 44*b* is positioned between the two reinforcing ribs 44*a*. Each of the reinforcing ribs 44*a* is made up of a series of ring holders with a pentagonal cross-section, as in the first embodiment. Because of this structural advantage, even if some parts of the reinforcing rib 44*a* adjacent to the display region 22*a* are abraded due to severe sand blasting, the space between the two substrates 41 and 42 can be maintained as reinforcing ribs 44*a* can still function to keep substrates 41 and 42 separated by the predetermined distance.

Figure 5:
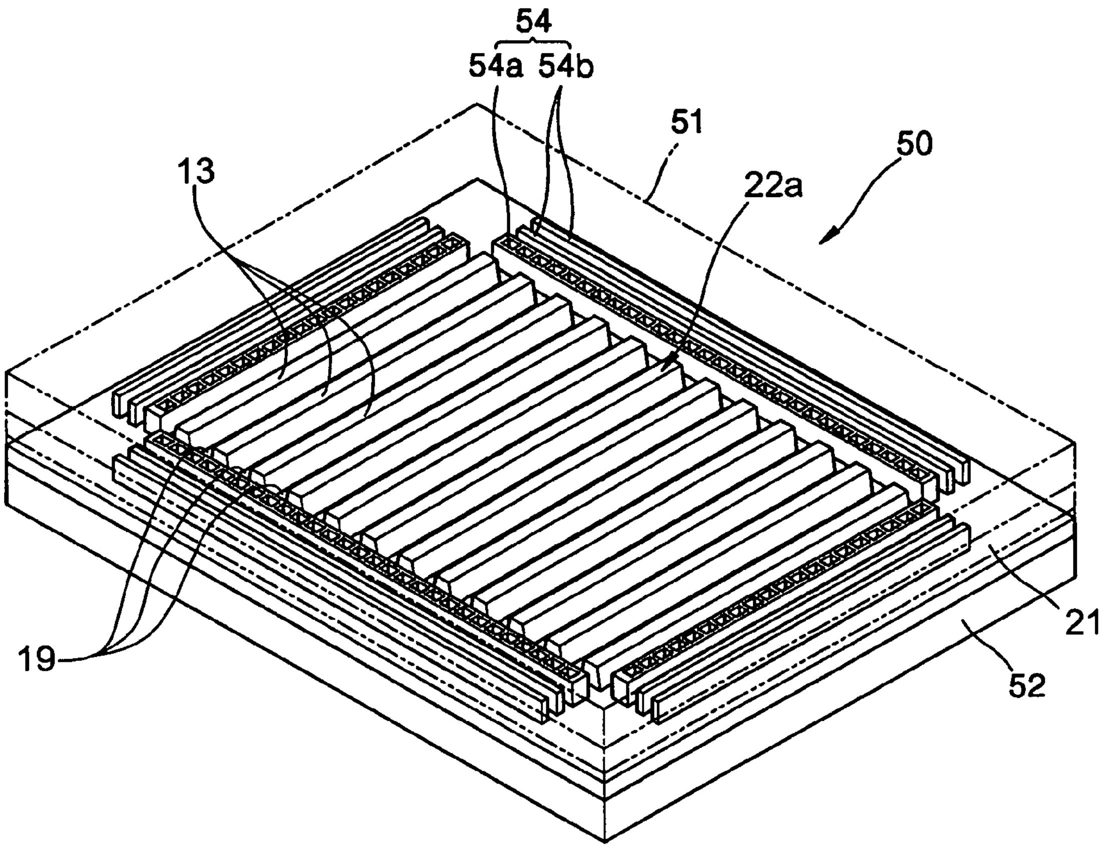
FIG. 5 is a perspective view of the structure of a plasma display panel according to a third embodiment of the present invention.

FIG. 5 illustrates a perspective view of the structure of a plasma display panel 50 according to a third embodiment of the present invention. Like the above-described embodiments of the present invention, the plasma display panel 50 has an upper and a lower substrates 51, 52 respectively sealed together by a sealant 21. Plasma display panel 50 has a display region 22*a* for displaying images and a plurality of sets dummy ribs 54 which are located outside the display region 22*a* and are spaced away from the display region 22*a* by a predetermined distance. Each dummy rib in each set 54 is parallel to each other. Each set of dummy ribs 54 serves to hold the upper and the lower substrates 51, 52 apart by a predetermined distance. At least one of the ribs in each set 54 is a reinforcement rib 54*a*. FIG. 5 illustrates one reinforcement rib 54*a* per set 54, the reinforcement rib 54*a* being closest to the display region 22*a*.

As illustrated in FIG. 5, each dummy rib set 54 has three dummy ribs in parallel. Although three are illustrated, this invention is not limited thereto and four or more ribs can be in each set if so desired. One rib that is positioned closest to the display region 22*a* is the reinforcing rib 54*a*. The reinforcing rib 54*a* is a series of ring holders with a square cross-section, while the other two ribs 54*b* are simple long rectangular walls. In other words, reinforcing rib 54*a* is a line of squares raised off the lower substrate 52. Each square is similar to a section of a hollow tube having a square cross section. Because of this structural advantage of reinforcing rib 54*a*, even if some parts of the reinforcing rib 54*a* adjacent to the display region 22*a* are abraded during a sand blasting process, the structural strength of the reinforcing rib 54*a* can be maintained by its square parts. At the same time, the reinforcing rib 54*a* serves to prevent damage to the other two ribs 54*b*.

Figure 6:
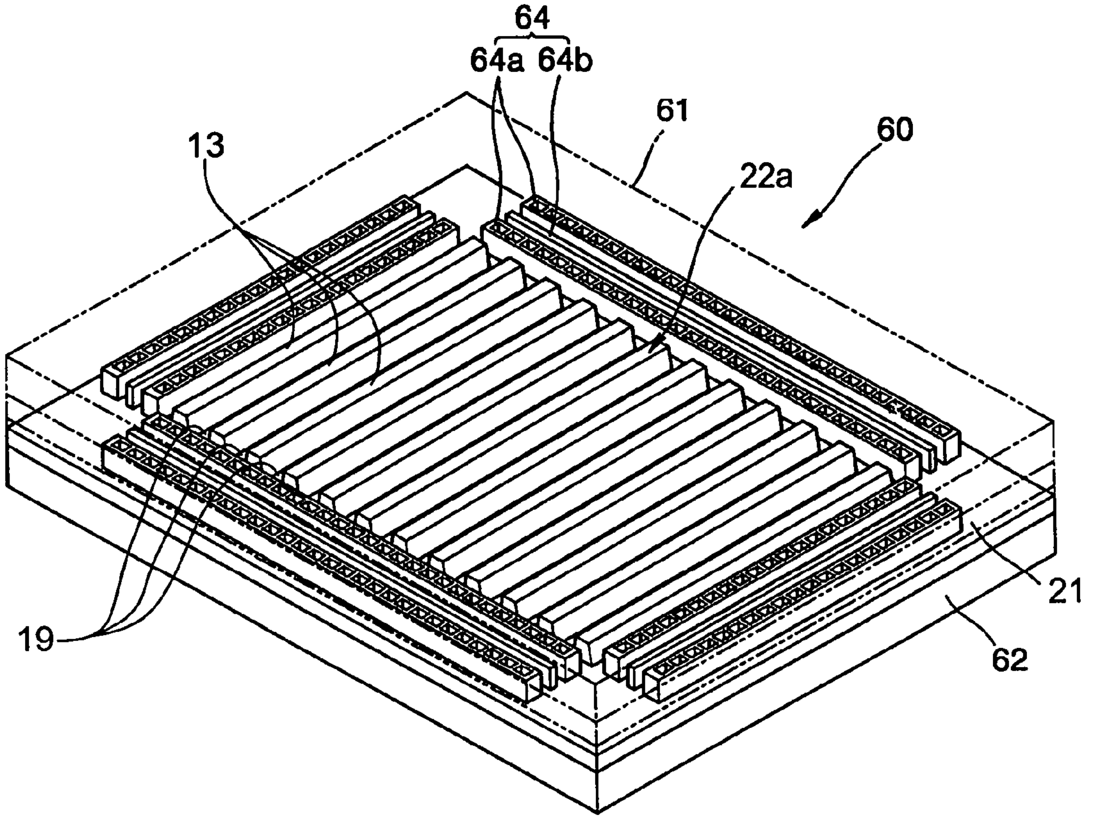
FIG. 6 is a perspective view of the structure of a plasma display panel according to a fourth embodiment of the present invention.

FIG. 6 illustrates a perspective view of the structure of a plasma display panel 60 according to a fourth embodiment of the present invention. Like the above described embodiments of the present invention, a plasma display panel 60 has upper and lower substrates 61 and 62 bound together by sealant 21. The display panel 60 has a display region 22*a* at a center and a plurality of sets of dummy ribs 64 spaced by a predetermined distance from the display region 22*a*. As in the other embodiments, the sets of dummy ribs 64 are used to hold the upper substrate 61 a predetermined distance from the lower substrate 62. As illustrated in FIG. 6, each set 64 has two reinforcing ribs 64*a* and one standard rib 64*b*. The standard rib 64*b* is in between the reinforcing ribs 64*a*.

As illustrated in FIG. 6, each set of dummy ribs 64 has three dummy ribs in parallel. However, this invention is not limited to three as there may be four or more dummy ribs in each set 64. Two ribs that are positioned closest to and farthest from the display region 22*a* are the reinforcing ribs 64*a*. A simple long rectangular rib (or standard dummy rib) 64*b* is positioned between the two reinforcing ribs 64*a*. Each of the reinforcing ribs 64*a* is a series of ring holders with a square cross-section as in the reinforcing ribs 54*a* of the third embodiment. Because of this structural advantage of reinforcing ribs 64*a*, even if some parts of the reinforcing rib 64*a* adjacent to the display region 22*a* are abraded due to severe sand blasting, the space between the two substrates 61 and 62 can be maintained as the reinforcing ribs 64*a* can continue to function as spacers.

Long rectangular dummy ribs may cause various problems when damaged. In contrast to such dummy ribs, because the dummy ribs of the present invention have reinforcing ribs, each of which is a series of closed structures or closed ring holders with a cross-section of a predetermined shape, the dummy ribs can withstand with the pressure of the upper substrate even when damaged.

Figure 7:
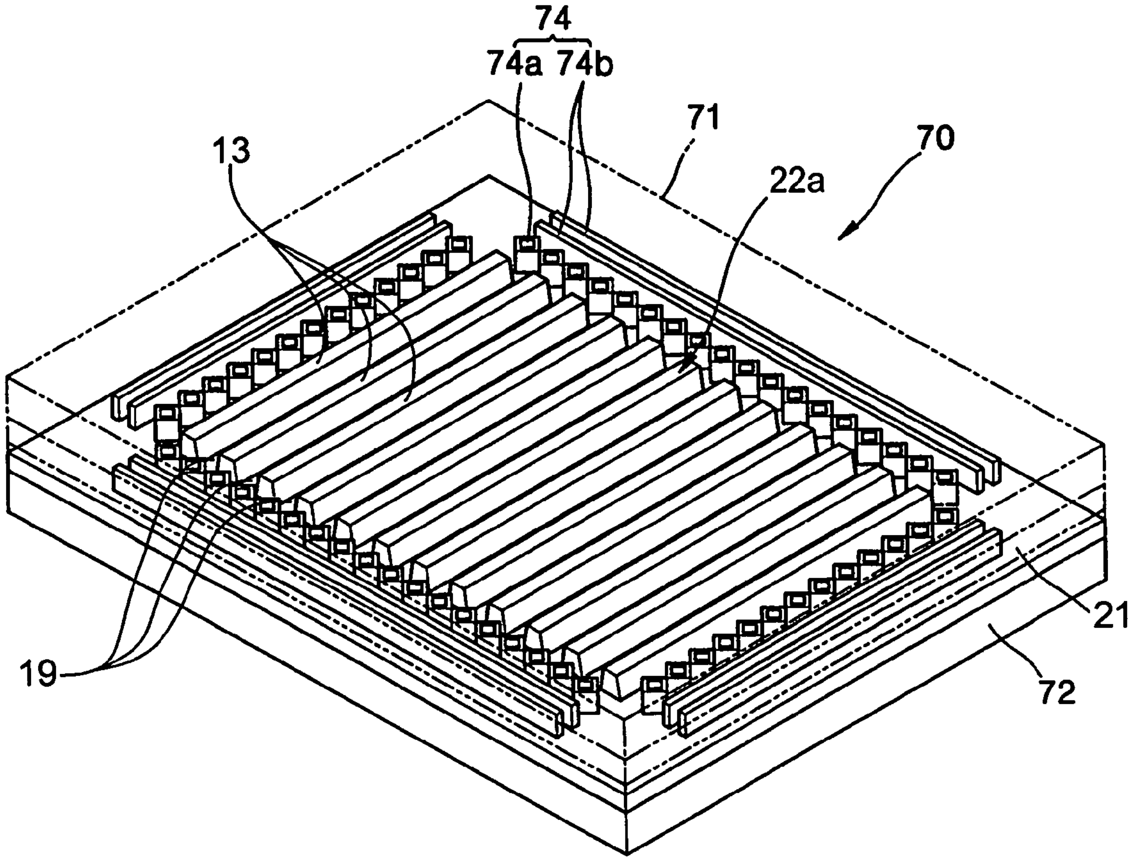
FIG. 7 is a perspective view of the structure of a plasma display panel according to a fifth embodiment of the present invention.
Figure 8:
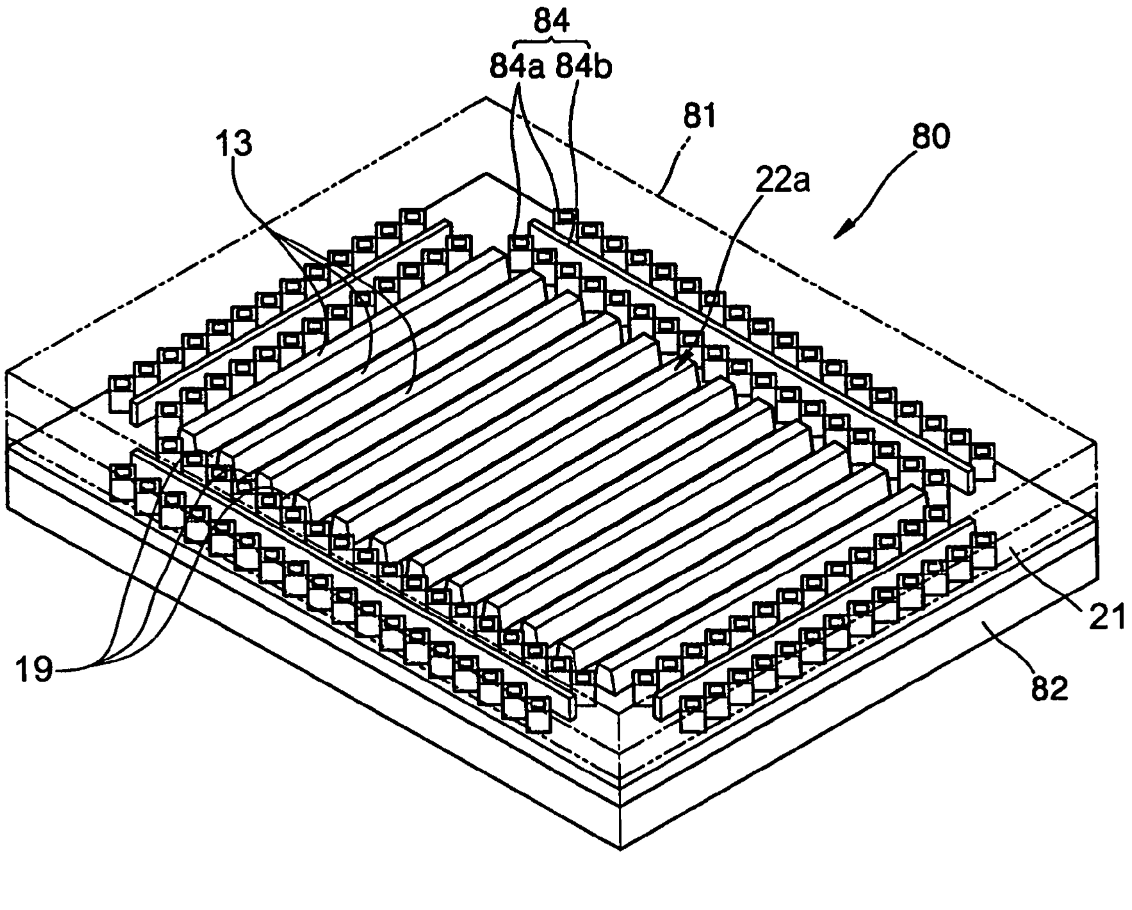
FIG. 8 is a perspective view of the structure of a plasma display panel according to a sixth embodiment of the present invention.

According to other embodiments of the present invention, the reinforcing ribs may have circular or other polygonal cross-sections, i.e., hexagonal or lozenge (diamond)-shaped cross-sections. FIGS. 7 and 8 illustrate the structures of plasma display panels 70 and 80 having reinforcing ribs 74*a* and 84*a* with lozenge-shaped or diamond-shaped cross-sections. Elements of plasma display panels 70 and 80 other than the reinforcing ribs 74*a* and 84*a* are the same as in the first four embodiments. The shapes of the cross-sections of ring holders can be selected by considering the easiness to manufacture and the pressure the upper substrate has on the lower substrate of the plasma display panel.

Figure 9:
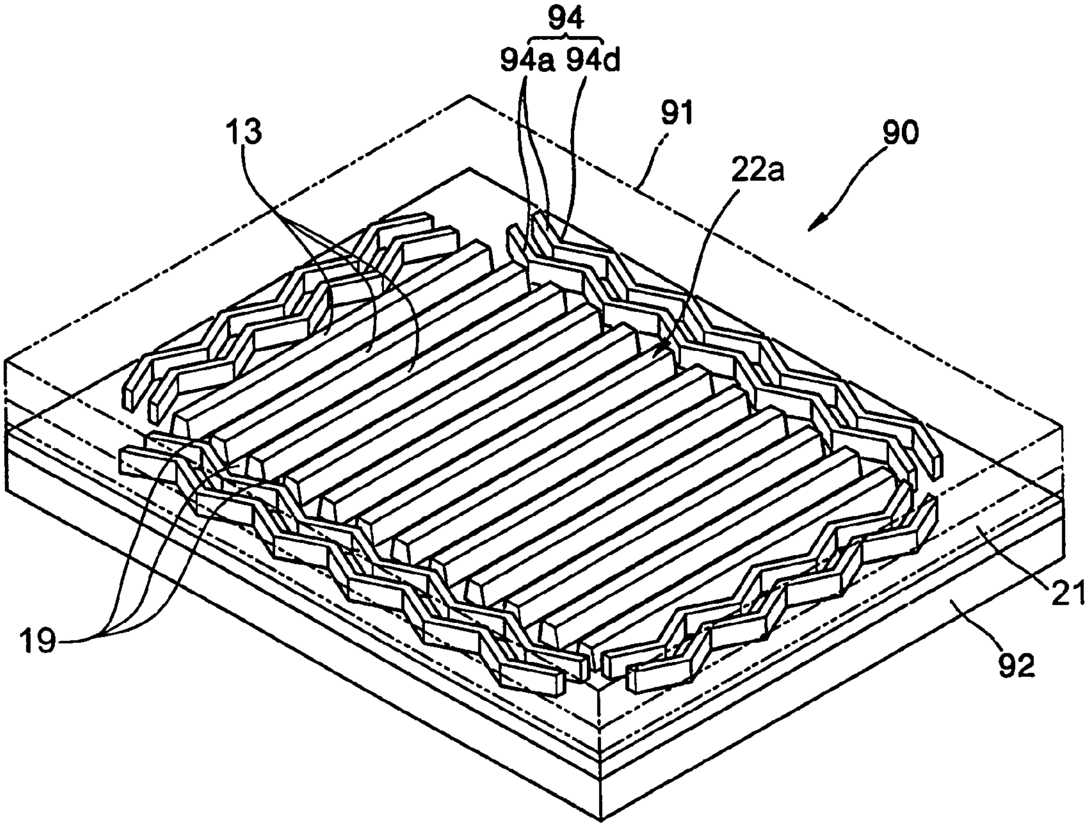
FIG. 9 is a perspective view of the structure of a plasma display panel according to a seventh embodiment of the present invention.

FIG. 9 illustrates a seventh embodiment of the present invention. As illustrated in FIG. 9, each set of dummy ribs 94 have two ribs in parallel. Each rib has straight or reinforcing portions 94*a* and bent portions 94*d* disposed between straight portions 94*a*. Each dummy rib 94 is a series of straight reinforcing portions 94*a* and bent portions 94*d*. As in the other embodiments, FIG. 9 illustrates four sets of dummy ribs 94, one on each side of the display portion 22*a*. Although two ribs are illustrated in each set, the present invention can contain three or more ribs in a set.

Figure 10:
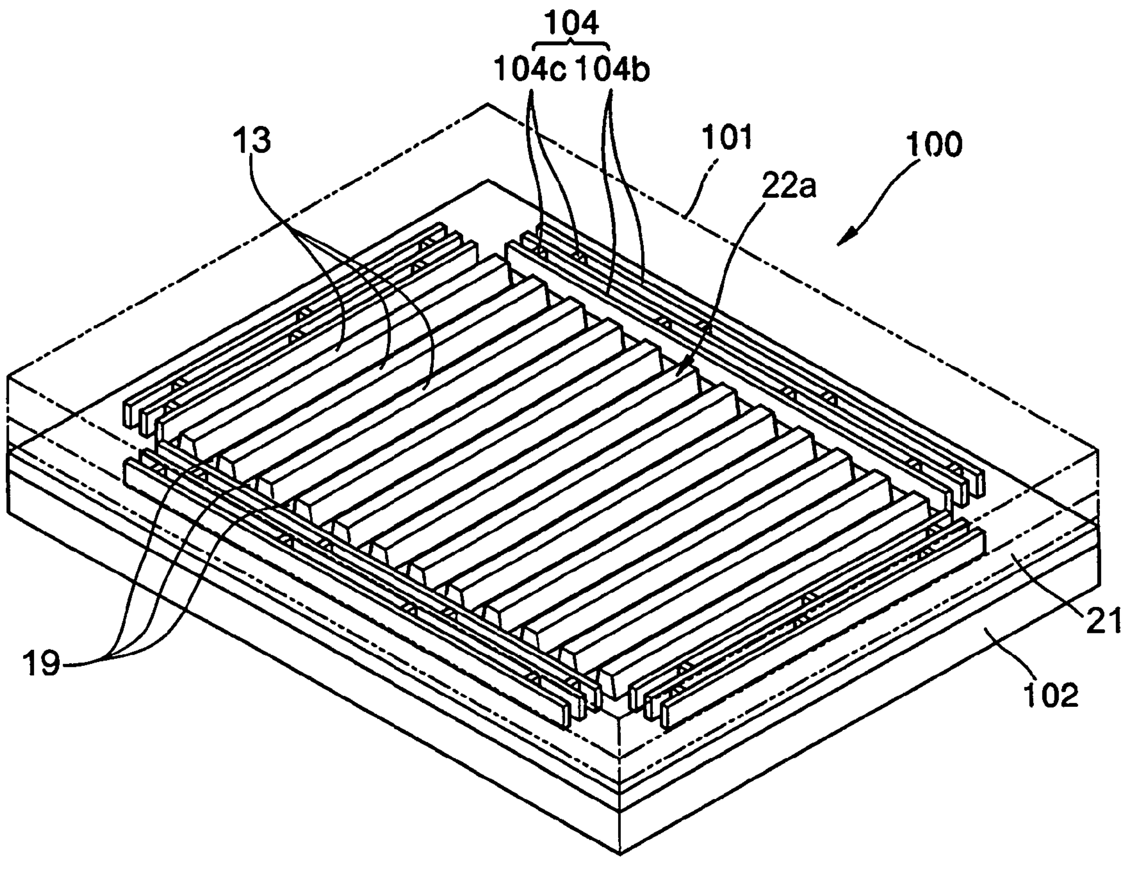
FIG. 10 is a perspective view of the structure of a plasma display panel according to an eighth embodiment of the present invention.

Turning to FIG. 10, FIG. 10 illustrates dummy rib sets 104 according to an eighth embodiment of the present invention. Dummy ribs 104 according to the eighth embodiment of the present invention as illustrated in FIG. 10 further comprise at least one connecting rib 104*c* for connecting neighboring ribs 104*b* to each other. Although FIG. 10 illustrates three ribs 104*b* in each set, fewer or more ribs per set can be contemplated.

Figure 11:
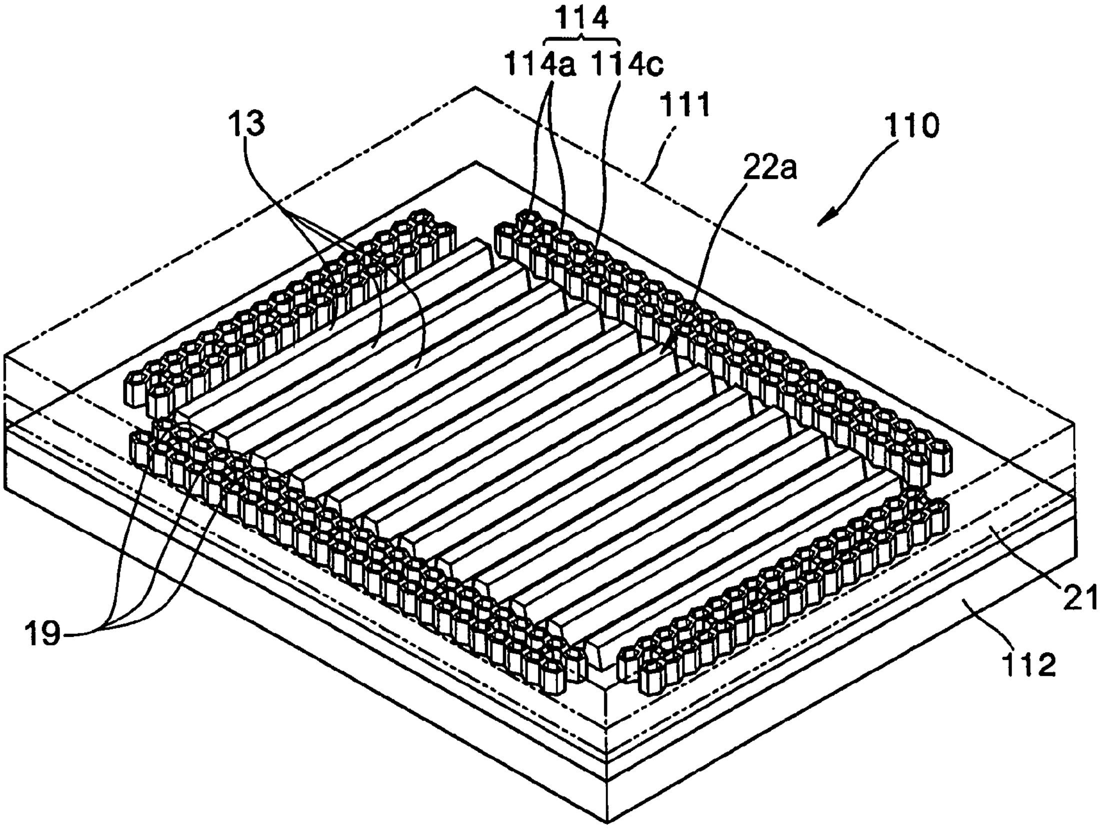
FIG. 11 is a perspective view of the structure of a plasma display panel according to a ninth embodiment of the present invention.

FIG. 11 illustrates a ninth embodiment of the present invention. In FIG. 11, dummy rib sets 114 are made up of a series of two closed reinforcing ribs 114*a* with a hexagonal cross-section and multiple connecting ribs 114*c* for connecting the two reinforcing ribs 114*a* to each other. It is to be appreciated that more than two rows can be used and that the reinforcing ribs may have other cross sections besides hexagonal.

Figure 12:
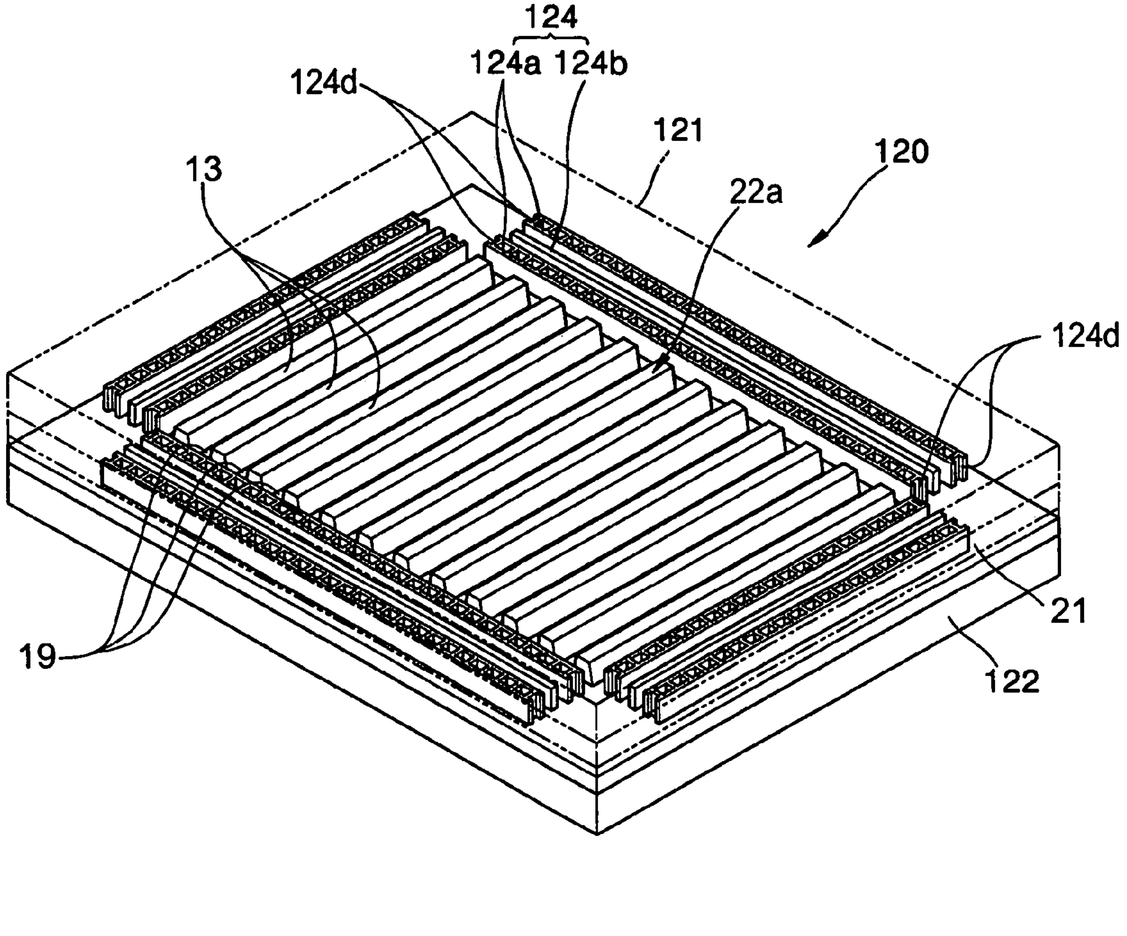
FIG. 12 is a perspective view of the structure of a plasma display panel according to a tenth embodiment of the present invention.

FIG. 12 illustrates a tenth embodiment of the present invention. Dummy rib sets 124 according to this embodiment have two reinforcing ribs 124*a*, one of which is positioned closest to a display region 123 and the other is positioned farthest from the display region 123. Unlike the fourth embodiment of FIG. 6, this tenth embodiment has each of the reinforcing ribs 124*a* having open ends 124*d*. Such an open-type structure of both ends is applicable to the above described various types of reinforcing ribs.

The dummy ribs may be formed on any one of an upper substrate or a lower substrate. Preferably, each dummy rib is formed as thin as possible while maintaining sufficient strength to support upper and lower substrates. The thickness of each dummy rib can be adjusted depending on the dimensions of the substrates and the shapes of the cross-sections of the reinforcing ribs. The material and fabrication method of dummy ribs can be applied to the present invention.

As apparent from the above description, because a plasma display panel of the present invention has dummy ribs with a reinforcing rib, damage to the dummy ribs caused by sand blasting is insignificant.

Furthermore, dummy ribs of a plasma display panel of the present invention have improved resistance to abrasion by an abrasive sand. Therefore, even if some parts of the dummy ribs are damaged due to the turbulence of the abrasive sand, the plasma display panel can function normally.

While the present invention has been particularly illustrated and described with reference to exemplary embodiments thereof, it will be understood by those of ordinary skill in the art that various changes in form and details may be made therein without departing from the spirit and scope of the present invention as defined by the following claims.

What is claimed is:

1. A plasma display panel, comprising:

upper and lower substrates which are installed to be spaced apart from each other by a predetermined distance and which contain therebetween a plurality of barrier ribs and discharge spaces that are disposed between the banier ribs in a display portion of the plasma display panel, the display portion being a portion of the plasma display panel where images are ordinarily formed, said upper substrate having a first plurality of electrodes that are orthogonal to a second plurality of electrodes in the lower substrate; and a plurality of sets of dummy ribs disposed on one of the upper and the lower substrates and being disposed outside the display portion of the plasma display panel, wherein one rib in each set of dummy ribs being a reinforcing rib, said reinforcing rib being a series of sections of a hollow, closed structure, wherein ribs within each set of dummy ribs being connected by connecting portions.

2. A plasma display panel, comprising:

upper and lower substrates that are installed to be spaced apart from each other by a predetermined distance and that contain therebetween a plurality of barrier ribs and discharge spaces that are disposed between adjacent the barrier ribs in a display portion of the plasma display panel;

a plurality of sets of dummy ribs disposed on one of the upper and the lower substrates and being disposed outside the display portion of the plasma display panel, wherein at least one rib in each set of dummy ribs being a reinforcing rib, said reinforcing rib being different in design from other dummy ribs and having a continuous shape; and a sealant sealing together the upper and lower substrates, wherein the reinforcing rib has a zig zag with multiple bending portions.

* * * * *